(12) United States Patent
Mukherjee et al.

(10) Patent No.: US 12,556,484 B2
(45) Date of Patent: *Feb. 17, 2026

(54) SYSTEM AND METHOD FOR ADAPTIVE GENERIC RECEIVE OFFLOAD

(71) Applicant: Enfabrica Corporation, Mountain View, CA (US)

(72) Inventors: Shrijeet Mukherjee, Mountain View, CA (US); Carlo Contavalli, Mountain View, CA (US); Shimon Muller, Mountain View, CA (US); Ariel Hendel, Mountain View, CA (US); Gurjeet Singh, Mountain View, CA (US); Rochan Sankar, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,574

(22) Filed: Mar. 14, 2025

(65) Prior Publication Data

US 2025/0219957 A1 Jul. 3, 2025

Related U.S. Application Data

(62) Division of application No. 18/096,354, filed on Jan. 12, 2023, now Pat. No. 12,255,826.

(51) Int. Cl.
*H04L 47/2483* (2022.01)
*H04L 47/41* (2022.01)
(Continued)

(52) U.S. Cl.
CPC .......... *H04L 47/2483* (2013.01); *H04L 47/41* (2013.01); *H04L 47/621* (2013.01); *H04L 49/901* (2013.01); *H04L 49/9068* (2013.01)

(58) Field of Classification Search
CPC ..... G06F 9/545; H04L 47/2441; H04L 69/22; H04L 49/9042
See application file for complete search history.

(56) References Cited

U.S. PATENT DOCUMENTS 11,934,318 B2   3/2024   Fan et al.
11,947,483 B2   4/2024   Helps et al.
(Continued)

OTHER PUBLICATIONS

International Search Report and Written Opinion for International Patent Application No. PCT/US2024/011070, dated Jun. 13, 2024 (16 pages).

(Continued)

*Primary Examiner* — Mahran Y Abu Roumi
(74) *Attorney, Agent, or Firm* — Goodwin Procter LLP

(57) ABSTRACT

An adaptive generic receive offload (A-GRO) system and method are disclosed. In some embodiments, the system comprises a host including a host protocol stack and a host memory, and a network interface card that is communicatively connectable to the host. The A-GRO system is configured to: receive a packet from a network, parse the packet to a header and a payload, classify and map the packet into a particular flow based on contexts associated with a plurality of flows and the header, and move the header and the payload to separate queues associated with the particular flow in the host memory, without holding and stalling the packet in hardware of the NIC. By maintain packet coherence information including header chains, the A-GRO allows the host to skip processing the packets between the first and last headers in a GRO aggregation. The A-GRO system also improves mis-ordering packet handling.

16 Claims, 11 Drawing Sheets

(51) Int. Cl.
  *H04L 47/62* (2022.01)
  *H04L 49/90* (2022.01)
  *H04L 49/901* (2022.01)

(56) References Cited

U.S. PATENT DOCUMENTS

| | | |
|---|---|---|
| 11,972,292 B1 | 4/2024 | Fan |
| 2013/0007296 A1* | 1/2013 | Mukherjee .......... H04L 49/9057 709/231 |
| 2016/0147592 A1* | 5/2016 | Guddeti ................ H04L 1/0082 714/776 |
| 2020/0053029 A1* | 2/2020 | Javadi ................... H04L 49/208 |
| 2020/0120190 A1* | 4/2020 | Cornett ............... G06F 9/45558 |
| 2020/0134308 A1* | 4/2020 | Javadi ................... G06F 40/284 |
| 2022/0021629 A1* | 1/2022 | Yefet ....................... G06F 9/545 |
| 2022/0217085 A1 | 7/2022 | Sankar et al. |
| 2023/0198913 A1* | 6/2023 | Rathnavel ............... H04L 47/36 370/230 |
| 2024/0296138 A1 | 9/2024 | Helps et al. |
| 2024/0311310 A1 | 9/2024 | Fan et al. |
| 2024/0422100 A1 | 12/2024 | Helps et al. |

OTHER PUBLICATIONS

Communication relating to the results of the partial international search for International Patent Application No. PCT/US2024/011070, annex to the invitation to pay additional fees, dated Apr. 23, 2024 (11 pages).

* cited by examiner

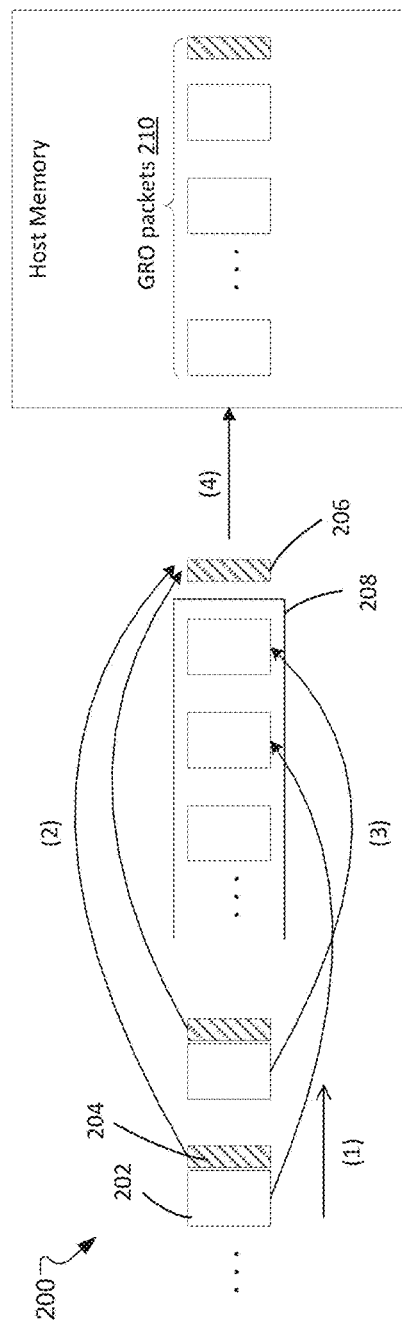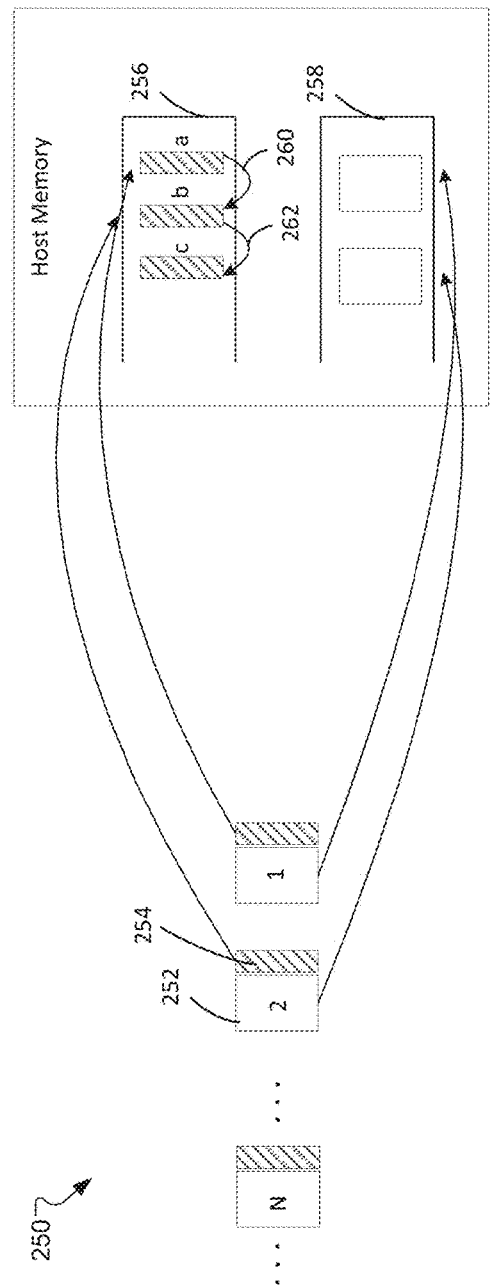
FIG. 2A (Prior Art)
FIG. 2B

SYSTEM AND METHOD FOR ADAPTIVE GENERIC RECEIVE OFFLOAD

CROSS REFERENCE TO RELATED APPLICATION

This application is a divisional of and claims priority to and benefit of U.S. patent application Ser. No. 18/096,354, filed Jan. 12, 2023, which is incorporated by reference herein in its entirety.

TECHNICAL FIELD

This disclosure relates to system and method of an adaptive generic receive offload (GRO) that obtains temporal locality, reduces processing latency, and improves out of order packet handling.

BACKGROUND

It is well known that cloud applications rely on tremendous amounts of data exchanged over network(s). One way to reduce the data processing overhead and facilitate data communication is to increase the Maximum Transfer Unit (MTU), i.e., the largest size of each packet or frame, and thus reduce the number of packets to be processed. This, however, may negatively influence the processing efficiency, for example, when a very large packet is dropped and retransmitted to cause congestion. Additionally, physical MTU is always limited by the in-network memory available for buffers and cannot scale to large sizes (typically 9-16 Kilobytes). A variety of techniques that decouple the fast data communication and processing from MTU sizes have evolved over the past years. Since packet processing is only performed on packet headers, some of these techniques allow multiple packets to be presented with a single meta-header such that one header rather than multiple headers are processed, thereby reducing the processing rate. These techniques typically implement the data offload in both transmit and receive directions. For example, Generic Receive Offload (GRO) or Large Receive Offload (LRO) may be applied in the receive direction. GRO/LRO can achieve substantial processing efficiencies by accumulating multiple received data segments, which belong to the same networking flow, into a single event notification to a networking protocol stack with a single meta-header. This effectiveness, however, is highly dependent on the temporal locality of packets of a data flow, the degree of multiple flows interleaving in the network, the use of per packet optional headers, and an in-order packet delivery with no packet drop, etc.

SUMMARY

To address the aforementioned shortcomings, an adaptive generic receive offload (A-GRO) system and method are disclosed. In some embodiments, the A-GRO system comprises a host including a host protocol stack and a host memory, and a network interface card that is communicatively connectable to the host. The A-GRO system is configured to: receive a packet from a network; parse the packet to a header and a payload; classify and map the packet into a particular flow based on contexts associated with a plurality of flows and the header associated with the packet; and move the header and the payload to separate queues associated with the particular flow in the host memory, without holding and stalling the packet in hardware of the NIC.

In some embodiments, the receiving stack in an A-GRO system is also configured to: receive a packet from the NIC; identify, from a receive completion list, a GRO packet sequence to which the packet belongs; determine whether the packet is an in-between packet based on whether the packet is associated with a first header or a last header in a GRO aggregation chain associated with the GRO packet sequence; and in response to determining that the packet is an in-between packet, select to skip processing a header associated with the packet.

In some embodiments, the receiving stack of an A-GRO system is further configured to: receive a packet from the NIC; compare a sequence number of the packet with contexts stored for existing aggregations associated with a flow that the packet belongs to, wherein the contexts include at least a first sequence number and a last sequence number associated with each existing aggregation; determine whether a relevant aggregation exists based on comparing the sequence number of the packet with the contexts for existing aggregations; in response to determining that the relevant aggregation exists, adjust at least one sequence number of the relevant aggregation; and in response to determining that no relevant aggregation exists, perform at least one of: assigning a new aggregation context to a new aggregation starting with the packet or flushing the existing aggregations associated with the flow.

GRO system hardware enables the receiving stack to perform operations of reducing per-packet processing overhead as described herein. In some embodiments, the GRO system hardware may create packet aggregations, keep track of each aggregation, identify a completion of aggregation (e.g., a single largest coalesced bytes as indicated by a header chain), and transmit the complete GRO aggregation chain. When tracking each packet aggregation, the GRO system hardware may adjust and/or combine aggregations upon arrival of new packets to create the largest aggregation that can possibly be allowed (e.g., as described by the header chain).

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 2A illustrates an overview of the prior art GRO approach, according to some embodiments.

FIG. 2B illustrates an overview of the new adaptive GRO (A-GRO) approach, according to some embodiments.

DETAILED DESCRIPTION

Figure 1:
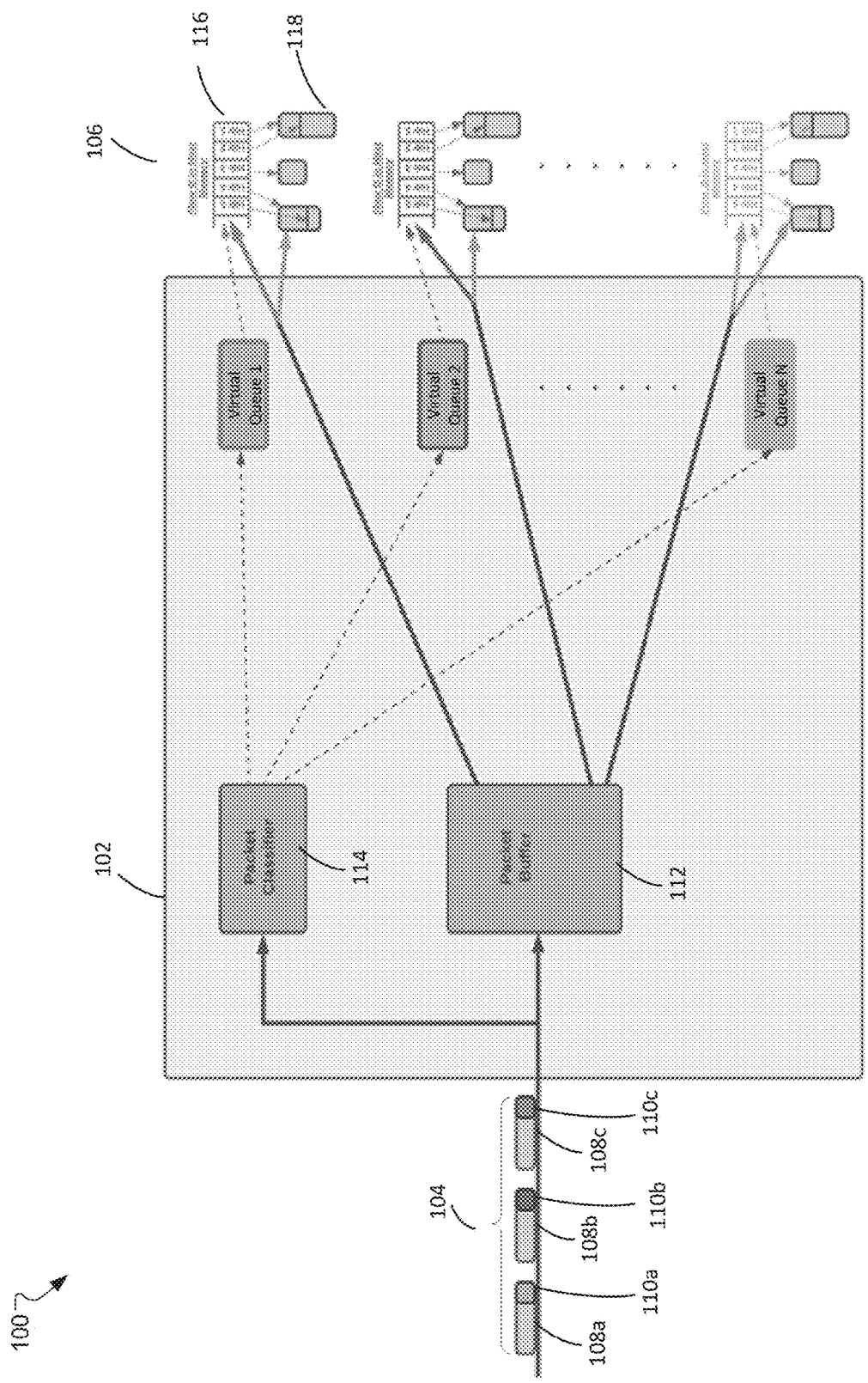
FIG. 1 illustrates the queuing structures in a network interface card (NIC) and a host memory providing adaptive receive offload, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of Problems and Existing Solutions

Cloud applications are based on tremendous amounts of data exchanged over networks, such as data exchanged among servers (e.g., machine-to-machine) or between servers and data consumers (e.g., machine-to-user). In either case, data exchange utilizes fast network interconnects, and the speed of network communication has been growing exponentially over the last few decades to keep up with application demands. Therefore, networking hardware and software (e.g., deployed in servers) face the ultimate challenges to sustain the maximum throughput delivered by the networks without compromising application performance, where the application performance may be affected by excessive consumption of computing resources for network protocol processing needs.

One of the most prevalent networking interconnects is Ethernet. Typically, Ethernet carries packets that comply with transport protocols such as Transmission Control Protocol (TCP) or User Datagram Protocol (UDP). These protocols package the application data (e.g., data from a cloud application) into packets by segmenting the application data into small data chunks with each chunk having a Maximum Segment Size (MSS), and adding a transport header (e.g., based on TCP or UDP protocols) and an Internet Protocol (IP) header (e.g., based on IPv4 or IPv6 protocols) to each data segment/chunk. A packet may then be encapsulated into an Ethernet frame by adding an Ethernet header and trailer. When an Ethernet frame encapsulating a packet is transmitted over the network and arrived at a destination, it is decapsulated. All the headers added to each Ethernet frame and packet are removed, and the original data stream is reassembled and passed to the cloud application. This protocol stack processing and application data segmentation/reassembly procedure consume non-trivial compute resources. The more packets required to send and receive an application block of data, the more compute resources are consumed.

An approach to reduce the protocol stack processing overhead is to increase the MTU size, i.e., the size of the entire Ethernet frame, thereby reducing the number of packets required to transfer a given block of data. However, once the packet size becomes too large, it may have the opposite effect and potentially reduce the effective throughput. This may happen when packet(s) drops in the network, for example, as a result of bit errors (which become more and more frequent as the link speeds increase), or as a result of increased congestion in switches due to suboptimal packet buffer usage. A dropped packet needs to be retransmitted by its source host. When a larger packet is dropped due to a single error event, this may result in a larger amount of data being retransmitted, thereby increasing the overhead on transmit links and processing hosts. A large packet size may also be detrimental to the error robustness of data integrity digests and checksums that are commonly used by networking protocols. Additionally, an MTU size is always limited by the buffer space available in a network device while applications typically want an MTU that is larger. Therefore, a common practice is to limit the MTU size to an application payload that fits into a typical host memory page (e.g., 4 KB, 8 KB), plus the required network protocol headers.

Based on the packet size limitation and distribution, a server complex connected to a single 800 gigabit per second (Gbps) network interface would be expected to process up to 1.2 billion packets per second. Furthermore, it is not uncommon for systems deployed in cloud data centers to contain multiple network interfaces with aggregate capacities in multiple Terabits per second (Tbps) rates, which requires extremely high packet processing rates. It is therefore needed to decouple the protocol stack processing granularity from the network protocol MTU size, thereby substantially lowering the protocol stack processing for the ubiquitous TCP/IP/Ethernet network environments.

In order to alleviate the processing load required to sustain the enormous number of packets offered by the line-rate throughput through the network interfaces, a variety of packet processing batching techniques have evolved over the years. Some techniques take advantage of the feature that packet processing in the protocol stack is only performed on packet headers. If multiple MTU-sized packets can be presented to the protocol stack by a single meta-header, to create an illusion that a very large MTU is exchanged between a network interface and a host stack, the processing rate in the stack will be substantially reduced.

In the transmit direction, a typical batching technique is TCP Segmentation Offload (TSO) or Large Send Offload (LSO). Using TSO/LSO, the protocol stack operates on large chunks of payload data (e.g., 64 KB) with a single meta-header. Before any packet is sent out on the wire, a NIC or certain low-level software may create MTU-sized packets with headers. These headers are packet-specific headers created using the meta-header as a template and by updating the packet-specific mutable fields. In the receive direction, Generic Receive Offload (GRO) or Large Receive Offload (LRO) operates in a similar fashion. However, since the packets that belong to the same TCP byte stream are not always received back-to-back, GRO/LRO in the receive direction is more challenging than the TSO/LSO in the transmit direction. GRO/LRO may achieve substantial processing efficiencies by accumulating multiple TCP segment arrivals that belong to the same networking flow, into a single network event notification with a single meta-header. The current GRO/LRO, however, has some shortcomings as described below.

Limitations of Existing GRO

GRO is a widely used offloading technique to reduce per-packet processing overheads. GRO allows applications to process fewer large packets directly by reassembling small packets into larger ones. The classic GRO design attempts to coalesce subsequent packets that belong to the same stream by utilizing a limited set of "contexts." Each flow is hashed into a context. All the packets (e.g., in their entirety) that correspond to a particular flow are stored in a context buffer. Each packet that arrives at the receiving end is checked. If there is a new flow, a new context is created for the flow, and the packet is stored in a new context buffer. If the received packet belongs to a flow represented by an existing context, this packet is appended to the corresponding existing context buffer.

Specifically, when a packet arrives and the packet belongs to the same flow as the previous packet, GRO would add the incoming packet to the context buffer that stores the previous packet, and continue to wait for a fixed timeout period for any more packets from the same flow to arrive. Once the timer (e.g., typically a round trip time (RTT)) expires, GRO determines that the packet processing of this particular flow is complete. As a result, the context corresponding to this flow and all the packets that have been accumulated in the context buffer are flushed to the host/server. On the other hand, when the incoming packet that hashes into the context belongs to a different flow than the previous one, and all the limited hardware contexts are full, the context and its associated context packet buffer are flushed immediately, and a new context is created. Regardless of what caused the flush condition, a flush event coalesces all the packets in a context into a single header, e.g., a single meta-header, with the indicated payload being the sum of the payloads of all the coalesced packets.

Packet Reordering. One of the most serious impediments to the effectiveness of the classic GRO scheme is its inability to tolerate packet reordering in the network fabric. Packet reordering in a TCP byte-stream is identified by a gap in the Next Byte Sequence Number in the TCP header, which is expected to be contiguous in a 32-bit number space. This gap in the sequence numbers may occur for several reasons. For example, this gap or reordering may be caused by packet loss in the network as a result of congestion or bit error events. This gap may also occur when packets belonging to the same flow take different routes across the network fabric. The different routes may be either intentional (e.g., spray) or accidental, such as route changes.

Responsive to detecting a perceived packet reordering, the classic GRO implementations terminate the packet aggregation sequence and flush all the accumulated packets to the host protocol stack for processing. The dropped or reordered packets may have arrived in short order; however, the classic GRO implementations are typically suboptimal and do not benefit as expected due to relatively short batching sequences of received packets. Additionally, packets in a stream which carry optional extensions may also cause the batch to be shortened, (e.g., when Fast Retransmission and Selective Acknowledgement TCP protocol variants are used).

Temporal Locality and Flow Interleaving. Temporal locality is a concept that a resource that is referenced at one point in time will be referenced again sometime in the near future. In network flows, a referencing behavior, e.g., the interactivity among the flows on network protocol or content in recent past, may be used to predict and thus reduce the processing of the current flow. Another major challenge for the existing GRO designs is to identify temporal flow locality in the received packet stream and coalesce same-flow packets into packet batches that are long enough to achieve the high GRO processing efficiencies. Traditionally a queue is assigned to hold this locality. This problem is exacerbated because, oftentimes, end nodes have to process a very large number (e.g., thousands or even millions) of flows at any given time, but only a limited number of queues can be provided to store the packets for these flows due to hardware limitations. Therefore, if the degree of flow interleaving is greater than the number of queues provided for flow queuing, it is very likely that packets from multiple flows have to land in the same hardware queue in an inter-mixed fashion. One example of a queue containing multiple flows is the above-described "hashing context buffer" scheme and its shortcomings. Since packets are always hashed over a fixed set of contexts, flow collisions lead to highly inefficient GRO utilization. For example, there may be 100 flows in a millisecond, and one flow may move 10-megabyte data. Therefore, at any given time, a flow may find each of 16 or 64 contexts has been used by at least one other flow. This particular flow has to share the context and queue with other flow(s), which causes interleaving or even full stop of flows, thereby reducing GRO efficiency.

Alternative packet batching schemes may be based on "look-ahead queues" to identify packets that belong to the same flow and are subject to aggregation. These batching schemes, however, may experience similar difficulties. That is, packets at the head of a queue may block the GRO to get to the packets in the queue that are of interest for completing an aggregation in a timely manner.

Latency Penalty. As described above, if and when GRO operates as expected for the maximum efficiency, packets are indicated/flushed to a host's protocol stack either when a timer expires or when a desired number of payload data bytes have been accumulated. In other words, unless a packet arrives earlier than a maximum time (e.g., an RTT), GRO has to wait for this packet until the maximum time expires (even if this packet never arrives). This introduces a built-in fixed latency penalty in the protocol stack processing, resulting in a higher TCP round-trip time (RTT) parameter and negatively affecting application performance. It is hard to determine an acceptable trade-off between GRO efficiency (e.g., bandwidth, throughput, CPU utilization, etc.) and end-to-end latency that applications can tolerate.

Adaptive GRO

The present disclosure provides a system and method for Adaptive GRO (A-GRO) that addresses the shortcomings of existing systems. The A-GRO system disclosed herein is based on the following principles:

Early packet separation into flows with a desired precision. A-GRO supports either a fully specified 5-tuple header or some other degree of flow aggregation.

Continuous packet movement from the network to host memory without artificially imposed stalls.

No packet modifications. Neither headers nor payloads are modified. Also, there is no need to modify meta-headers.

No GRO-imposed packet queuing in the NIC hardware, that is, all packet queues reside in the host's memory.

Using per-flow hardware virtual queues with a very lightweight footprint, which allows practical implementations that support a large number (e.g., thousands or even millions) of distinct packet flows. Only meta data is queued in these virtual queues.

Supporting dynamic batching of packets that are GRO candidates. A host can start processing packets as soon as the packets arrive without waiting for an entire GRO batch to complete, if the host has CPU cycles available. Otherwise, the virtual queues are allowed for backup. When the CPU cycles become available again, the packets will be processed in batches, either complete or partial.

Supporting a bounded but practically reasonable number of re-ordered or dropped packets in a GRO aggregation sequence at any given time, without terminating the GRO aggregation sequence.

Ingress Packets are segregated and moved. In some embodiments, the A-GRO system allows each packet that arrives at a network port to be parsed, classified, and assigned to a network flow. A packet may be assigned to a particular flow based on pre-defined criteria. In some embodiments, the criteria may identify an individual end-to-end flow based on protocol headers, for example, based on 5-tuple elements of a protocol header. The 5-tuple elements include {L3-DIP, L3-SIP, PROTOCOL, LA-DPORT, L4-SPORT} that respectively correspond to a destination IP address, source IP address, protocol (e.g., TCP), a destination port, and a source port. Alternatively, the criteria may identify various flow aggregations either by omitting some protocol headers or by wildcarding some protocol header fields during the classification process. For example, the protocol header fields may include {L3-DIP, PROTOCOL, L4_DPORT} based on wildcarding. Each packet is therefore assigned to either an individual flow or an aggregated flow.

In some embodiments, the A-GRO system may organize each flow (e.g., individual or aggregated) as a separate queue in a host's memory. A host is a receiver that consumes a packet or forwards the packet. The queuing in the host's memory may be managed by the NIC in hardware along with a software driver, which will be detailed below in FIG. 1.

In some embodiments, the A-GRO system may also delineate the boundary between a packet header and a packet payload/application payload in the packet classification process, such that the header and the payload are segregated into two parts and are stored separately in a respective buffer in the host memory. In some embodiments, the headers from a given flow are stored in fixed-size buffers and are queued up for processing in the protocol stack based on the order of arrival, thereby creating a natural per-flow queue of packet arrival events in the host memory. On the other hand, the payloads are steered to application buffers. The A-GRO system would attempt to place the payloads in their correct positions in the application buffers relative to other payloads of the same flow, e.g. based on TCP sequence numbers.

It should be noted that both headers and payloads are unmodified when they are stored in the host memory. The storing process continues as long as header buffers and payload buffers are available at the host, and packets continue to arrive from the network.

Temporal Locality and Flow Interleaving

FIG. 1 illustrates the queuing structure 100 in a NIC and in a host memory that provides adaptive receive offload. As depicted, NIC 102 receives packets 104a, 104b, 104c (or collectively 104) from a network/wire, processes packets 104, and transmits packets 104 to host memory 106. Each packet of 104 includes a payload portion 108 and a header 110. For example, packet 104a includes a payload 108a and a header 110a, packet 104b includes a payload 108b and a header 110b, and so on. NIC 102 "offloads" at least part of the packet processing from the host system, such that the host protocol stack (e.g., host TCP/IP stack) would not need to handle all packet processing such as using TCP/IP headers to determine a connection/flow associated with each packet, placing the out-of-order arrival packets in a proper order based on TCP packet sequence numbers, or reassembling data received in pieces, thereby significantly saving the host's processing power and reducing the overhead.

At the NIC level, the hardware keeps track of all the flow queues in the NIC using per-flow Virtual Queues (VQs). A VQ is a minimal context structure and includes a pointer to host memory location. The context provides a current state of the VQ. The context is distilled from the packet headers and made into metadata that is used for making all GRO decisions. In FIG. 1, when packets 104a, 104b, and 104c in an ingress queue are passed into packet buffer 112, NIC 102 may use packet classifier 114 to extract the packets of a flow and put the packets of that flow into a virtual queue. In this way, packets of each flow are placed in a corresponding virtual queue. Each virtual queue is then examined to determine which packets have been received, whether the received packets can be linked together, whether there are missing segments, etc. Such information is tracked in the context associated with the virtual queue. The context per flow (or per virtual queue) therefore may tell which packet in that flow is received, missed, retransmitted, etc. Once the incoming packets are mapped into different data flows in different virtual queues, the header and payload of each packet are separated and stored in different buffers associated with each flow in the host memory 106. For example, packet 104c is mapped to a flow in virtual queue 1 associated with context 1. Accordingly, in host memory 106, header 110c stores in header buffer 116, and payload 108c stores in payload buffer 118. Similarly, in host memory 106, header 110b and payload 108b are stored in separate buffers associated with context 2 (i.e., virtual queue 2) to which packet 104b belongs, and header 110a and payload 108a are stored in separate buffers associated with context N (i.e., virtual queue N) to which packet 104a belongs.

As depicted in FIG. 1, NIC 102 does not queue and store the packets in its memory. Rather, NIC 102 only keeps the minimal context that indicates connection state information associated with each packet. All packet queues reside in the host's memory. NIC 102, therefore, does not keep the packets in the hardware. The data or packets are always moving and would not stall in the NIC hardware.

Furthermore, since no part of the packet itself is being manipulated or queued in the NIC hardware for GRO purposes, the flow's footprint in the NIC's hardware is extremely small, NIC 102 may process a large amount of data. In some embodiments, the footprint is the meta data or context identifier that identifies the flow queue or virtual queue that a packet will go into. Packet buffer 112 may buffer more incoming packets than other NIC hardware can provide, and thousands or millions of flows may be supported in practical implementations.

The architecture in FIG. 1 may be used to solve the above-mentioned temporal locality and flow interleaving problem, that is, resolving network flow collisions due to imperfect hashing of a large number of interleaved flows, while still being able to obtain temporal locality with efficient GRO batching. By providing a very large number of VQs with an extremely small hardware footprint, the queue structure in FIG. 1 may allow a dedicated queue to be provided to each unique flow that has been identified as a GRO candidate. Once the one-to-one mapping between queues and flows is accomplished, it is not hard to perform packet batching. That is, as long as the VQ in hardware is not empty, packets that have been mapped to that queue will automatically coalesce into a GRO aggregation sequence.

Based on the architecture in FIG. 1, the GRO system may use the flow queue or VQ to create a linked list and perform packet batching using the linked list. In some embodiments, the GRO system may create a header chain in the linked list by automatically creating the pointer to a packet header that may arrive in the future. The header chain is complete when a pointer to the packet header of the last packet in a flow is added to the linked list. At this time, the GRO system may append an entry to a completion queue. This completion queue entry (CQE) identifies the starting and ending (last) header. With the CQE, the GRO system can perform packet aggregation, that is, skipping processing the headers between the first and last headers, to reduce data processing costs. The GRO aggregation procedure will be detailed below with reference to FIGS. 2B-11.

Efficient Data Structures and Latency Improvements

FIGS. 2A and 2B illustrate a comparison between the existing GRO approach and the new A-GRO approach described herein. In the existing GRO procedure 200 of FIG. 2A, packets are passing through one or more ingress queues to a NIC in step (1). A packet includes a packet payload (e.g., 202) and a header (e.g., 204). The packet may be queued in a context queue (e.g., 208) in NIC hardware. Each context queue is associated with a context (e.g., 206) indicating the queue state per flow. As shown in step (2), the incoming packets are verified against the context based on the headers associated with each packet. If the packets are coherent and thus verified, in step (3), the packet payloads of the verified packets are moved into context queue 208. After a period of time, multiple payloads are moved in and the headers are accumulated. In step (4), the payloads are then moved to a host with a single header to form a large GRO packet 210.

The existing GRO in FIG. 2A includes a built-in latency due to the queuing and storing of the packets in the NIC. Using the new A-GRO approach, the NIC sends out the packets to the host as soon as possible, that is, A-GRO does not wait for the next packet to be sent to the host.

A-GRO is shown in FIG. 2B, where the $1^{st}$, $2^{nd}$, . . . $N^{th}$, . . . packets are sent to the NIC, and the $N^{th}$ packet is an arbitrary packet subsequent to the $1^{st}$ and $2^{nd}$ packets. Each packet includes a payload (e.g., 252) and a header (e.g., 254). When each packet is received at the NIC, the NIC parses and classifies the packet to obtain a header and a payload. The NIC then sends the packet and header to separate queues. For example, the header is sent to a header queue 256 and the payload is sent to a payload queue 258. The NIC sends the packets to the queues of a host's memory without holding them in the hardware of the NIC as shown in FIG. 2A.

The packets that belong to the same flow are identified and placed in the same header queue 256. In addition, A-GRO links these packets together using a header chain or linked list. Therefore, when the receiving/host CPU starts processing entry a in header queue 256, the host CPU can skip entry b because entry b is part of the link list. In some embodiments, A-GRO maintains a completion list or a CQE. The completion list shows a header range between a first header and a last header. The host can skip processing the headers in between the first header and the last header to lower the processing time and reduce the latency.

Figure 4:
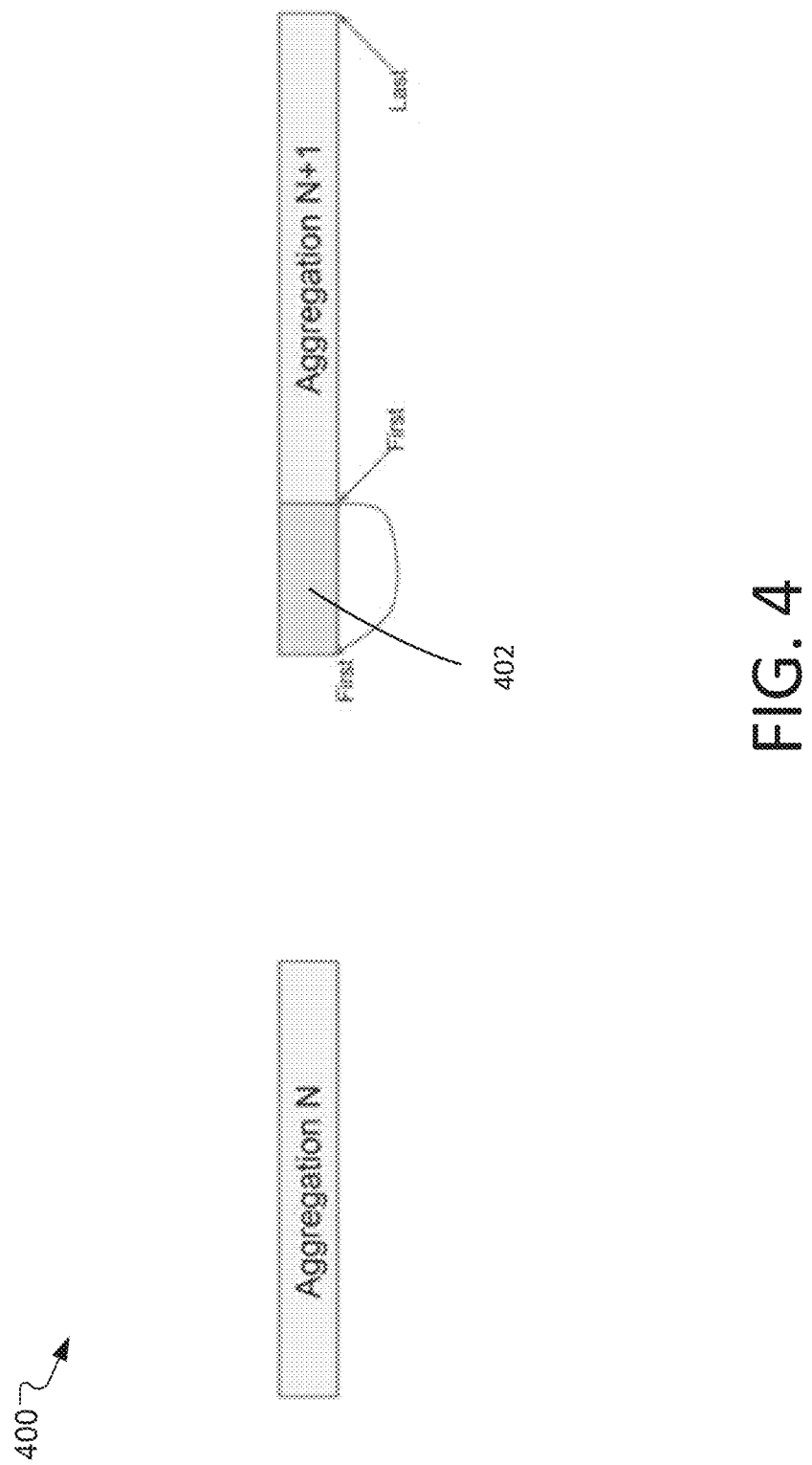
FIGS. 4-8 illustrate various scenarios of GRO state processing, according to some embodiments.
Figure 5:
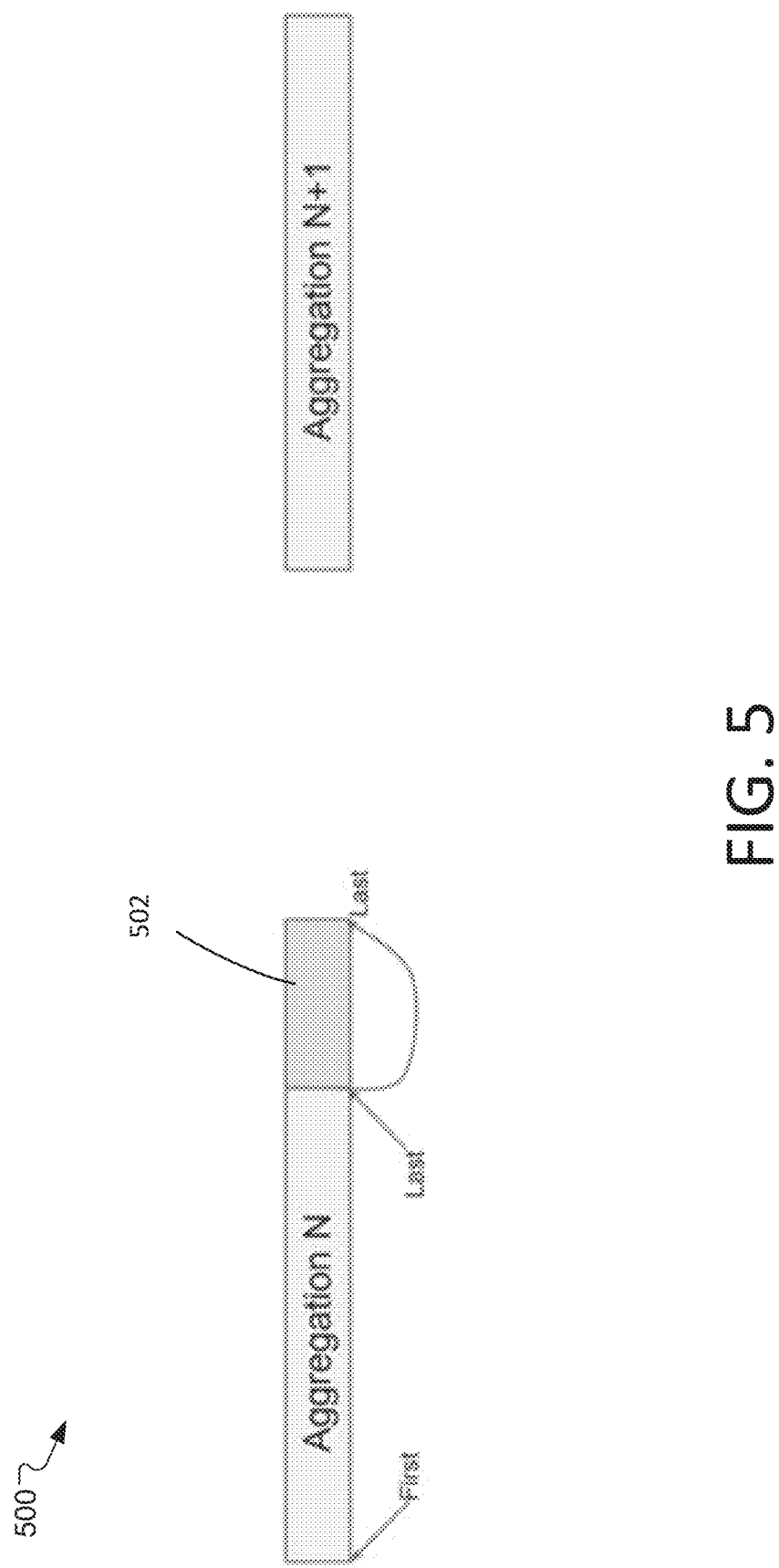
Figure 6:
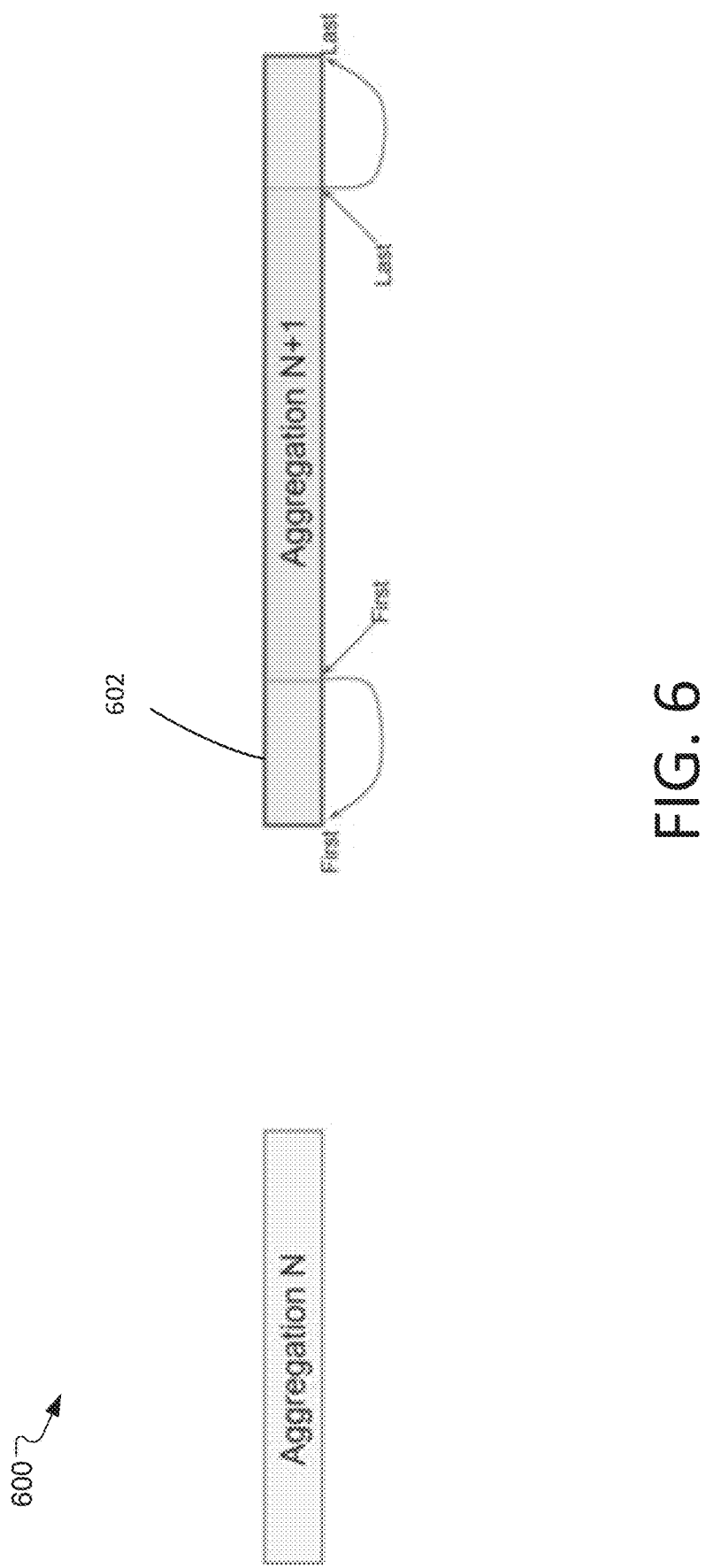

While no one can expect the next arriving packet, A-GRO is able to determine the linked list creatively. In some embodiments, A-GRO creates an entry list. When a header of an incoming packet needs to be filled in the header queue 256, A-GRO determines two entries instead of one entry. A-GRO would place the header of the incoming packet of a particular flow in one of the two entries of the header queue 256. A-GRO would also make the forward link to the other entry such that the next header will be placed in the linked entry, regardless of when the next packet of that particular flow associated with the next header may arrive. For example, when using header entry a for an incoming packet (e.g., packet 1) of a particular flow, A-GRO recognizes the next header entry that will be used in this flow is entry b, as indicated by 260. Since this link has been made, when the next packet belonging to this flow (e.g., packet 2) is received, the header of packet 2 will be placed in entry b. When A-GRO assigns entry b for the incoming packet 2, entry b is linked to entry c as shown in 262. Therefore when the next packet belonging to this flow comes, the header of this packet will be placed in entry c. While the next header is expected to be placed in entry c, as depicted in FIG. 2B, the arrival of the next packet including the next header is unexpected. This packet can be a packet subsequent to packets 1 and 2, which may arrive in order (e.g., packet 3) or out of order (packet N as depicted). Such a latency structure will be further detailed below with reference to FIGS. 4-7. For example, the NIC will adjust the usage of next entry to link when a re-ordered packet is seen. FIGS. 4-6 illustrate how the links are formed to indicate the order of reading the headers of receiving packets independent of the temporal order they arrived in.

Figure 3:
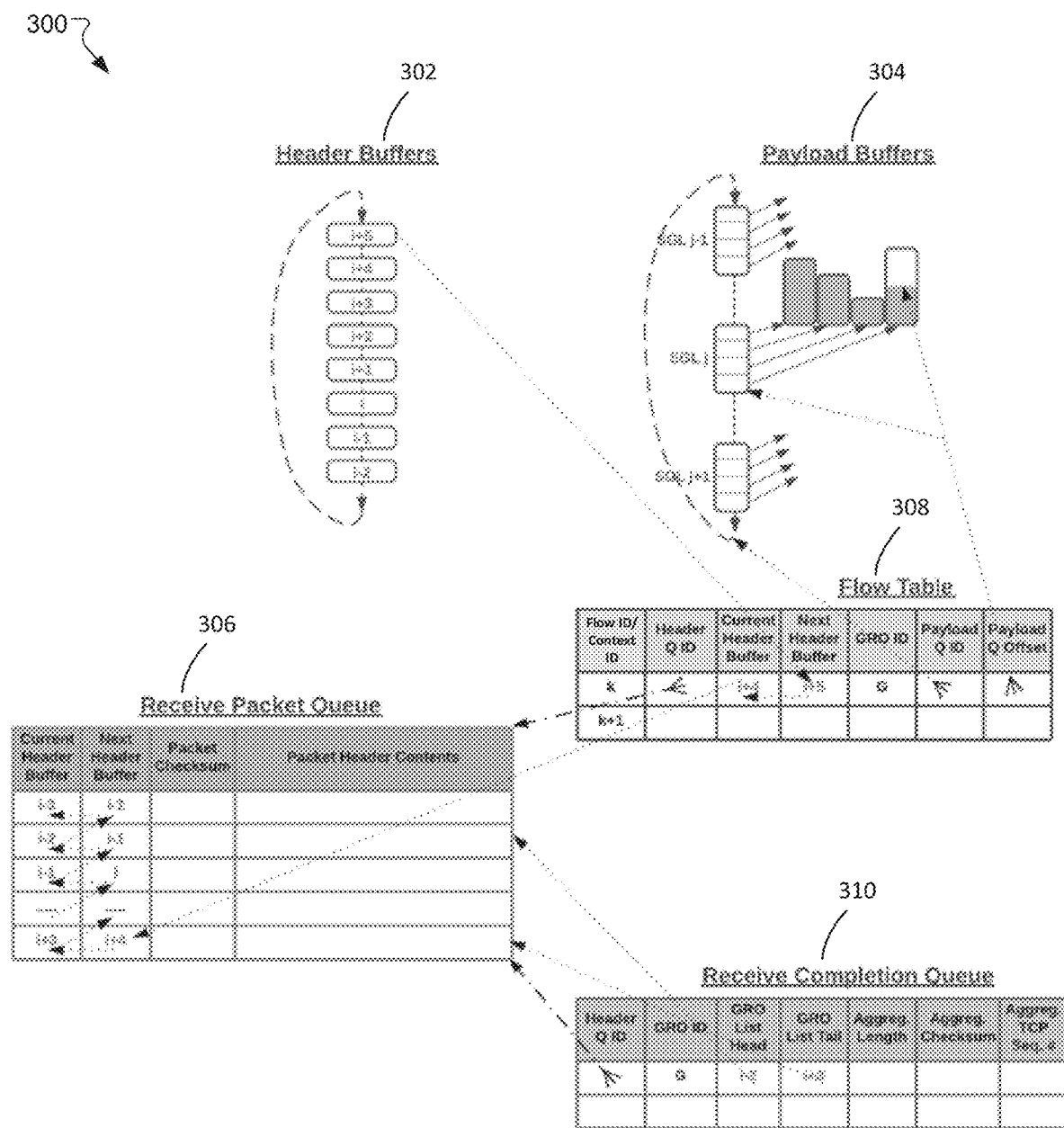
FIG. 3 illustrates a detailed view of queuing and buffering data structures in host memory that NIC hardware utilizes to interface with software stack, according to some embodiments.

FIG. 3 illustrates a detailed view of queuing and buffering data structures 300 in host memory that NIC hardware utilizes to interface with the host software stack. These efficient data structures are advantageous in latency improvement. As depicted, two types of buffers are used in conjunction with three efficient data structures to improve the data processing latency. In some embodiments, the buffers may be one or more header buffers 302 and one or more payload buffers 304. The data structures include a receive packet queue 306, a flow table 308 which holds per flow/context information, and a receive completion queue 310.

Header buffers 302 or receive header descriptors are anonymous buffers of a small fixed size either posted or pre-allocated by software (e.g., host protocol stack). These buffers are filled in by hardware (e.g., NIC hardware) with headers when incoming packets are received. In some embodiments, the filled-in receive header descriptors may include the entire packet header of each packet, with additional metadata to assist in software packet processing. The filled-in receive header descriptors may be chained together into a linked list.

Payload buffers or receive data buffers 304 are buffers of varying sizes to support the data flow provided by an application. The payload buffers 304 are also filled by hardware (e.g., NIC hardware), but these buffers contain only the packet payloads. In some embodiments, multiple payload buffers may be used to store a payload of a packet. The multiple buffers may be managed using the Scatter Gather List (SGL) descriptors that include a list of pointers and size information for the corresponding buffers.

Receive packet queue 306 is composed of filled-in receive header descriptors. These descriptors have been chained together into a linked list to make the receive packet queue 306 a software flow packet queue. These queues are essentially extensions of the per-flow virtual queues in hardware (e.g., NIC hardware). However, since the host software/ protocol stack has direct access to this software flow packet queue and the elements of the queue at any time, the host protocol stack does not need to wait for the GRO completion or a time-out timer to start processing the packets in that queue. If host CPU cycles are available, the fact that the software queue is not empty merely indicates that more packets need to be processed by the host protocol stack. A-GRO, therefore, does not stall the data at the NIC level, and there is no built-in latency. A person in the skilled art should realize that the dynamic nature of A-GRO can provide substantial latency savings when the stack-processing CPU is lightly loaded, while providing highly substantial CPU cycle savings in the protocol stack when required by application processing.

Flow Table 308 keeps track of the active flows and ties together a header queue with its corresponding payload data buffers. In some embodiments, each entry in the table is associated with a unique flow as determined by a packet classifier, such as flow identifier (ID) or context ID k in 308. Each entry may include a pointer to the header buffer that will be used for the next packet's arrival, and a pointer to yet another buffer that is reserved for the follow-on packet, if and when it arrives. In this way, flow table 308 may create a forward-linked chain of headers or header buffers. This enqueues a packet on the receive header queue 306 by automatically creating the pointer to the packet header that may arrive in the future. As shown in FIG. 3, the small black arrows indicate the chain of packet headers. It should be noted that in A-GRO, the packet headers are not changed. A-GRO uses at least the flow table and receive packet queue to show how these original packet headers are arranged and placed in buffers.

In some embodiments, flow table 308 may also include a pointer (or a queue ID that can be translated to a pointer) and an offset index to a payload/data buffer 304 where the packet payloads are to be stored. The payload queue includes SGL descriptors that the hardware can use to identify the free data buffers where the payloads are placed.

Receive completion queue 310 is the main communication channel between the NIC's hardware machinery and the host software for packet processing in the receive direction. In some embodiments, entries in receive completion queue 310 may be used to notify the host of received packet completions, with state information intended to assist in software packet processing. A special format of a completion entry may be used to indicate a GRO flush event when the desired coalescing byte-count or time-out has been achieved. Specifically, in A-GRO processing, the completion entry provides a GRO ID to identify a unique GRO packet sequence, pointers to the first and last headers in the GRO aggregation chain (i.e., forward linked chain of headers/header buffers), and the receive header queue where the chained headers can be found. In some embodiments, receive completion queue 310 may also provide the total number of bytes that were aggregated, the protocol data integrity digest (e.g., checksum) of the aggregated payloads, and the sequence number in the TCP byte stream of the first byte in the GRO aggregation.

To reduce the processing latency, A-GRO allows the NIC to directly pass through the incoming packets to the host rather than queuing and holding the packets in the hardware. In addition, A-GRO provides the packet coherence information (e.g., a linked list of packet headers, a receive completion queue) such that the host may skip processing some headers to further lower the processing latency. When packets arrive in the receive direction, if the system does not care about the latency, the host may still check each packet header and arrange and place the packet headers and payloads accordingly. However, if low latency is desired, the host may not omit the linked list. Rather, the receive software handler in the host CPU may utilize the list to skip processing of all the headers in the coalesced sequence (e.g., every header in between the first header and last header of the list), and validate the relevant receive data buffers as valid. In this way, A-GRO is capable of significantly reducing the processing latency and increasing the processing efficiency.

Packet Reordering and Drop Recovery

To improve the effectiveness of GRO batching in the presence of either perceived or real packet reordering, A-GRO described herein should be able to tolerate and accommodate, at any given time, at least a certain number of packets that have been delivered out of order. Since the missing packets usually arrive in short order, a certain number may not be a large number.

While the arrival order of packets can be out of order, i.e., only the first and last headers need to be processed, the packet payload must be in order to recover correct data. To provide support for out-of-order packet processing, the presented A-GRO approach takes advantage of the above-mentioned continuous movement of packets in the hardware from the network to the host memory with no artificially imposed stalls, as well as header-payload delineation with both headers and payloads delivered to their final destinations. Furthermore, the presented A-GRO takes advantage of the fact that the actual order of packet header and payload movements is irrelevant, as long as this order has been restored by the time the host protocol stack is notified of their arrival. As a result, the reordering of received packets becomes merely an accounting effort of performing arithmetic manipulations of the 32-bit TCP sequence numbers, as shown below.

The TCP sequence number is a 4-byte field in the TCP header that helps to keep track of how much data has been transferred and received. The TCP sequence number also ensures that missing or reordered packets can be detected and fixed. When data is lost or arrives at a destination out of order, the data may be retransmitted or re-sequenced to restore the original order based on the TCP sequence number. For example, the TCP sequence number for a packet is X, and the length for the packet is Y. If this packet is successfully transferred to a destination, then the TCP sequence number for the next packet is X+Y. Therefore, each out-of-order packet would create a discontinuity or gap in the TCP sequence number ranges for all the packets that have already arrived. This logic can be easily extended to any protocol which has a message number and offset of the packet in the message present in the header.

In-between sequence number gaps, all the packets that either arrived in-order or have already been reordered create a contiguous GRO aggregation. The maximum number of gaps or aggregations depends on the level of reordering that an implementation has chosen to support. For example, if packets 1-7 are received, packets 8-10 are not received (e.g., missed or re-routed), and packets 11-16 are received, then the first 7 packets and packets 11-16 may respectively create a contiguous GRO aggregation. The host software stack has the ability to process the first 7 packets without waiting for packets 8-10, and thus the latency is for processing packets 1-7 rather than packets 1-10.

In some embodiments, the aggregations are logically arranged from the lowest to highest based on the sequence number ranges that they cover, and a lightweight hardware context is created for each aggregation at the flow queue.

The context may include the first and last sequence numbers for the aggregation. In some embodiments, the aggregations may be reshuffled or renumbered to maintain the lower-to-higher logical arrangement, if necessary, after a new packet has been processed. If the maximum number of aggregations has been reached, an additional out-of-order packet will terminate the GRO sequence and generate a flush of the partial aggregations.

Every new packet arrival triggers a GRO state processing event using the saved flow queue contexts, in addition to the TCP sequence number and the payload length of the newly received packet. The sequence number comparison is performed in parallel on all saved contexts for a given flow, which may result in one of the five scenarios described below with reference to FIGS. 4-8.

When a new packet arrives, the host software/protocol stack compares the sequence number of this packet with the contexts for existing aggregations. The contexts include the first and last sequence numbers for the existing aggregations. In scenario 400 of FIG. 4, the payload of a new packet 402 fits at or overlaps with the lower end of an existing aggregation, e.g., aggregation N+1. This indicates that the aggregation N+1 "grows" at the lower end, whereby the sequence number of the new packet becomes the first sequence number for the relevant aggregation N+1. For example, the received packets 1-7 create aggregation N, and the received packets 11-16 create aggregation N+1, but packets 8-10 are not received (e.g., missed, re-routed, long travel path, etc.). When the packet 402, e.g., packet 10, receives as a new packet that is retransmitted or the original packet arrives late, the payload of this packet would be prepended to aggregation N+1 to recover the original data correctly, and the first sequence of aggregation N+1 becomes the sequence number of packet 10.

In scenario 500 of FIG. 5, the payload of a new packet 502 fits at or overlaps with the higher end of an existing aggregation e.g., aggregation N. This indicates that the aggregation N "grows" at the higher end, whereby the packet's {sequence number+payload length} becomes the last sequence number for the relevant aggregation N. For example, the received packets 1-7 create aggregation N, and the received packets 11-16 create aggregation N+1, but packets 8-10 are not received. When the packet 502, e.g., packet 8, receives as a new packet that is retransmitted or the original packet arrives late, the payload of this packet would be appended to aggregation N to recover the original data correctly, and the last sequence of aggregation N is turned to the sequence number+payload length of packet 8.

In scenario 600 of FIG. 6, the payload of a new packet 602 completely overlaps the entire existing aggregation N+1. This means that the aggregation N+1 "grows" both at the lower and the higher ends, whereby the packet's {sequence number} becomes the First sequence number, and the packet's {sequence number+payload length} becomes the Last sequence number for the relevant aggregation N+1. For example, the received packets 1-7 create aggregation N, the received packets 11-16 create aggregation N+1, and the received packets 17-18 create aggregation N+2, but in-between packets 8-10 and packets 17-18 are not received. When a new packet 602, including the payload of original packets 8-18 but with different sequence numbers, arrives as a result of retransmission, the payload of this packet would be attached to aggregation N+1 to recover the original data correctly, and the first and last sequence numbers of aggregation N+1 would be changed as described above.

Figure 7:
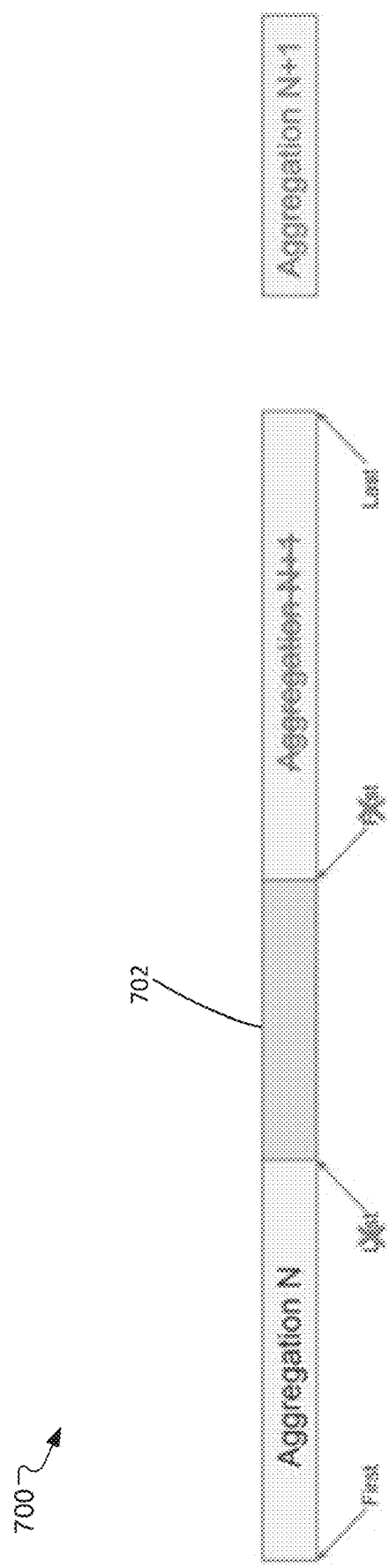

In scenario 700 of FIG. 7, the payload of a new packet 702 fits at or overlaps with both the higher end of one existing aggregation (e.g., aggregation N) and the lower end of another existing aggregation (e.g., aggregation N). This means that the newly arriving packet has plugged an existing gap in the flow. As a result, two aggregations are merged into one aggregation, thereby eliminating one of the hardware contexts in use. The context numbering is also reshuffled to maintain the lower-to-higher logical arrangement. For example, the received packets 1-7 create aggregation N, the received packets 11-16 create aggregation N+1, but in-between packets 8-10 are not received. When a new packet 702 including the payload of original packets 8-10 arrives, it fills in the gap between aggregation N and aggregation N+1 and thus combines the two aggregations into one single aggregation N. As a result, the context including the first and last sequence numbers for the aggregations of this particular flow would be reshuffled (e.g., aggregation N+2 is renumbered to N+1) to maintain the lower-to-higher logical arrangement to recover the original data correctly.

FIGS. 4-7 illustrate how the GRO system may be able to create the largest or maximum aggregation. In FIG. 4, the size of aggregation N+1 is increased because of the addition of the new first packet(s). In FIG. 5, the size of aggregation N is increased because of the addition of the new last packet(s). In FIG. 6, the size of aggregation N+1 is increased because of packet(s) retransmission that adds both new first packet(s) and last packet(s). In FIG. 7, when the last packet(s) arrives, it completes the gap between the aggregation N and N+1. As a result, the combination of aggregation N and N+1 becomes a larger aggregation N.

Figure 8:
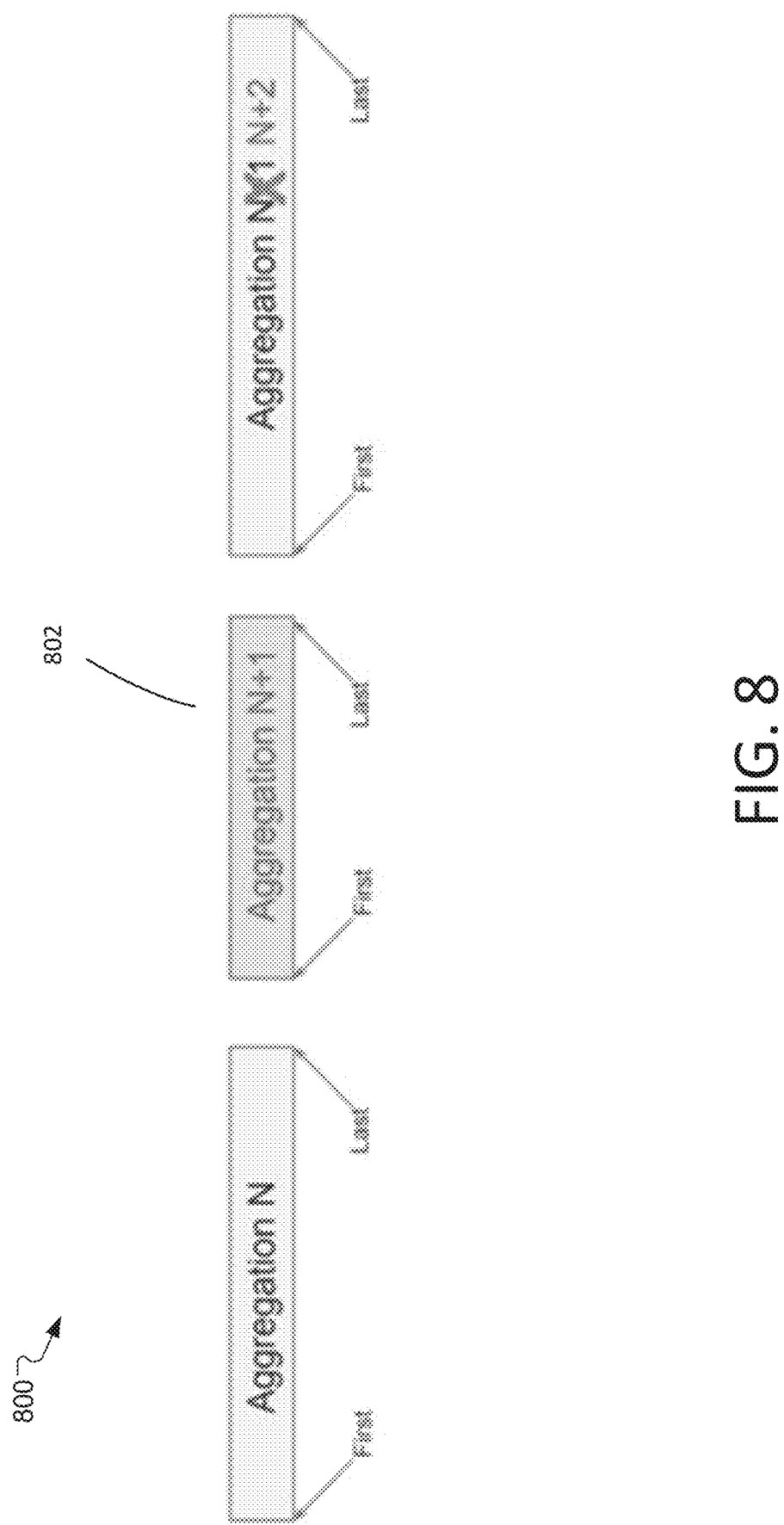

FIG. 8 shows the creation of a new aggregation. In scenario 800 of FIG. 8, the payload of a new packet 802 fits neither the lower end nor the higher end of any of the existing aggregations. This indicates that a new out-of-order packet has arrived that requires a new aggregation context. If a hardware context is available, it is assigned to the new aggregation (e.g., starting with the new packet 802) and the context numbering is reshuffled to maintain the lower-to-higher logical arrangement. Otherwise, the GRO batch is terminated and all the partial aggregations are flushed to the host.

Implementation Flows and Summary

Figure 9:
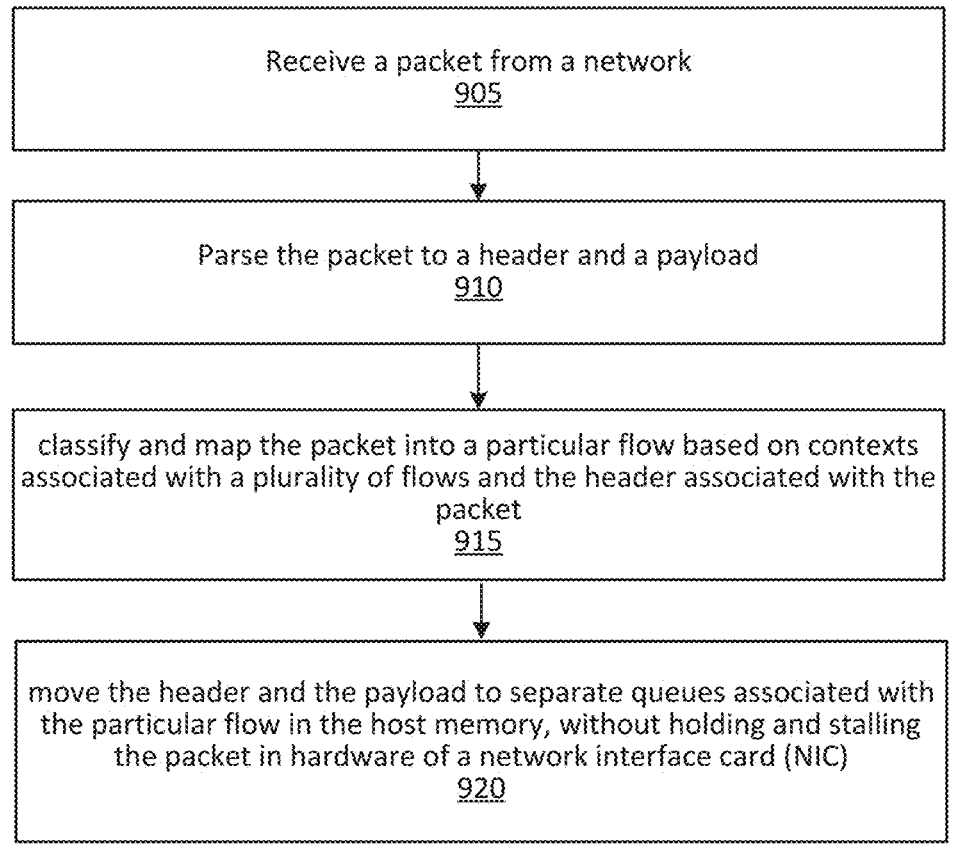
FIG. 9 illustrates an exemplary process of continuous data packet movement from a network to a host memory without an artificially imposed stall, according to some embodiments.

FIG. 9 illustrates an exemplary process 900 of continuous data packet movement from a network to a host memory without an artificially imposed stall, according to some embodiments. In some embodiments, an A-GRO system includes a host. The host receives data packets from NIC and consumes or forwards the packets. The host includes at least a host protocol stack and a host memory. The A-GRO system also includes a network interface card (NIC) communicatively connecting to the host to move the data packets to the host as soon as possible.

At step 905, the NIC is configured to receive a packet from a network. At step 910, the NIC parses the packet to a header and a payload such that the packet may be separated into a network flow in an early stage. At step 915, the NIC classifies and maps the packet into a particular flow based on contexts associated with a plurality of flows and the header associated with the packet. For example, a packet classifier may be used to determine to which context the packet belongs based on the header associated with each packet, where the context per flow may tell which packet in that flow is received, missed, retransmitted, etc.

At step 920, the NIC is configured to move the header and the payload of the packet to separate queues associated with the particular flow in the host memory, without holding and stalling the packet in the hardware of the NIC. For example, the header is moved to a header buffer in the host memory, the packet payload is moved to a separate payload buffer in the host memory, and neither packet payload nor header is modified when transmitting to the host memory. Therefore, the NIC does not queue and store the packets in its memory. Rather, the NIC only keeps the minimal context that indicates connection state information associated with each packet. All packet queues reside in the host memory. In this way, continuous packet movement from the network to host memory is achieved with increased processing efficiency.

Figure 10:
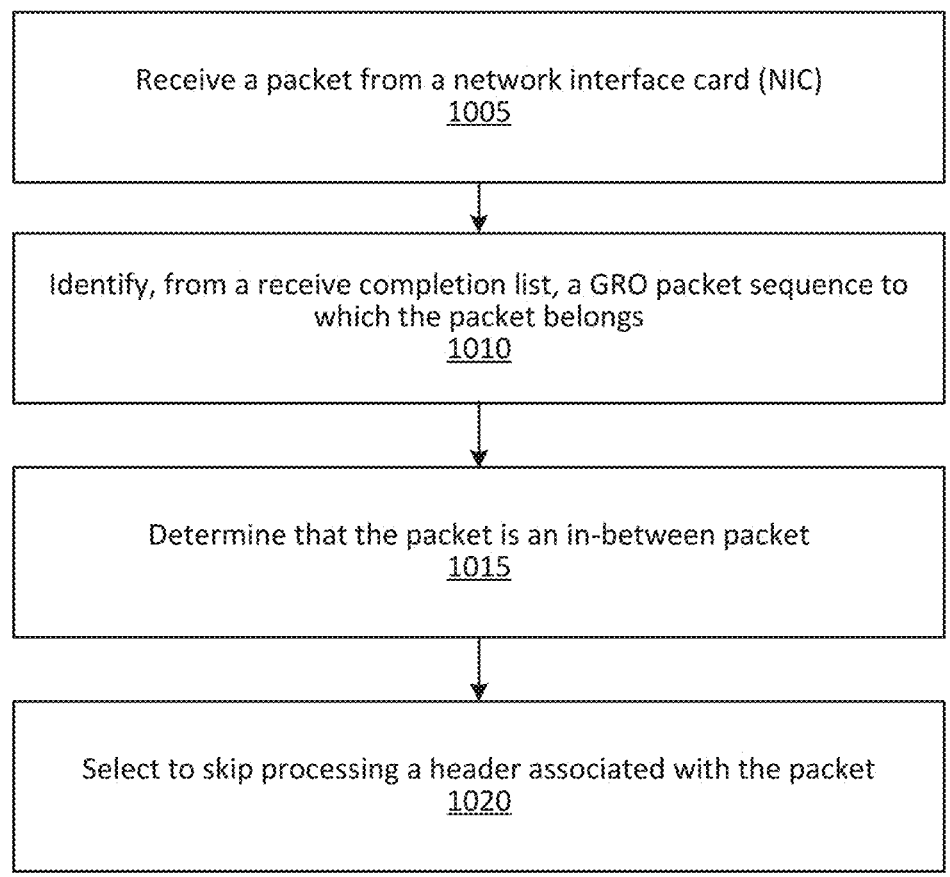
FIG. 10 illustrates an exemplary process of data packet processing with reduced latency, according to some embodiments.

FIG. 10 illustrates an exemplary process 1000 of data packet processing with reduced latency, according to some embodiments. In some embodiments, an A-GRO system includes a host. The host receives data packets from a network interface card (NIC) and consumes or forwards the packets. The host includes at least a host protocol stack and a host memory. The A-GRO system also includes the NIC configured to receive packets from a network and pass through the packets to the host.

At step 1005, the host protocol stack is configured to receive a packet from the NIC, as described in FIG. 9. At step 1010, the host protocol stack is configured to identify, from a receive completion list, a GRO packet sequence to which the packet belongs. In some embodiments, entries in receive completion queue 310 may be used to notify the host of received packet completions, with state information intended to assist in software packet processing. In A-GRO processing, the completion entry may provide a GRO ID to identify a unique GRO packet sequence, pointers to the first and last headers in the GRO aggregation chain (i.e., forward linked chain of headers/header buffers), and the receive header queue where the chained headers can be found. The receive completion queue may also provide the total number of bytes that were aggregated, the protocol data integrity digest (e.g., checksum) of the aggregated payloads, and the sequence number in the TCP byte stream of the first byte in the GRO aggregation.

At step 1015, the host protocol stack is configured to determine whether the packet is an in-between packet based on whether the packet is associated with a first header or a last header in a GRO aggregation chain associated with the GRO packet sequence. The first and second headers may be included in the receive completion queue. If the packet is an in-between packet, at step 1020, the host is able to select to skip processing a header associated with the packet. That is, the receive software handler in the host CPU may skip processing of all the headers in the coalesced sequence (e.g., every header in between the first header and last header), and validate the relevant receive data buffers as valid. In this way, A-GRO is capable of significantly reducing the processing latency and increasing the processing efficiency.

Figure 11:
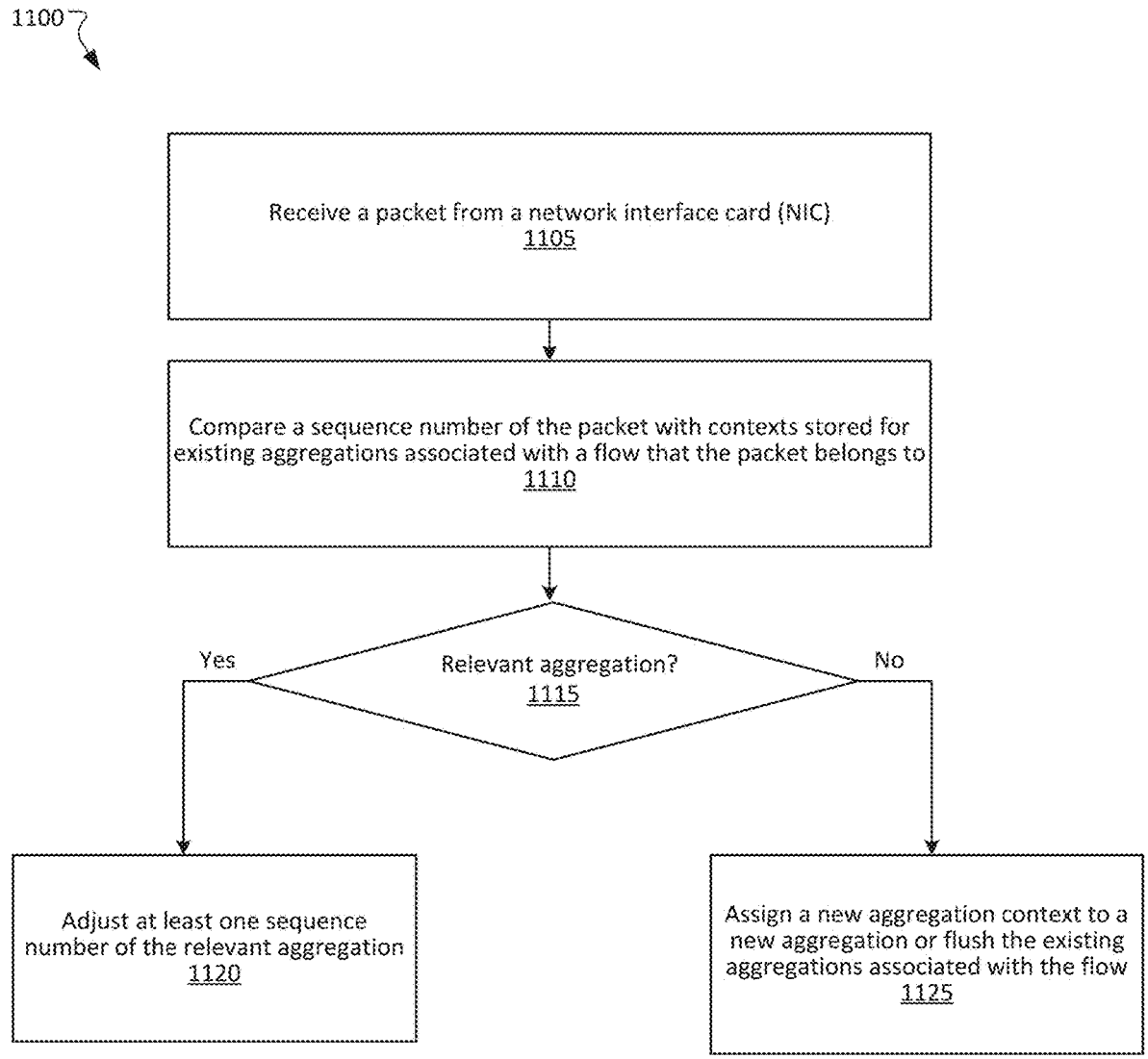
FIG. 11 illustrates an exemplary process for packet reordering and drop recovery, according to some embodiments.

FIG. 11 illustrates an exemplary process 1100 for packet reordering and drop recovery, according to some embodiments. In some embodiments, an A-GRO system includes a host. The host receives data packets from a network interface card (NIC) and consumes or forwards the packets. The host includes at least a host protocol stack and a host memory. The A-GRO system also includes the NIC configured to receive packets from a network and pass through the packets to the host.

At step 1105, a packet is received. At step 1110, the host protocol stack is configured to compare a sequence number of the packet with contexts stored for existing aggregations associated with a flow that the packet belongs. In some embodiments, the contexts may include at least a first sequence number and a last sequence number associated with each existing aggregation.

At step 1115, the host protocol stack is configured to determine whether a relevant aggregation exists based on comparing the sequence number of the packet with the contexts for existing aggregations. The relevant aggregation is an aggregation with which a payload of the packet overlaps. If there is a relevant aggregation exists, at step 1120, the host protocol stack is configured to adjust at least one sequence number of the relevant aggregation as shown in FIGS. 4-7. Otherwise, at step 1125, the host protocol stack is configured to assign a new aggregation context to a new aggregation starting with the packet or flush the existing aggregations associated with the flow, as shown in FIG. 8.

To summarize, the presented disclosure describes a novel system and method for adaptive generic receive offload. This A-GRO approach is advantageous in at least the following aspects:

- Enables GRO packet aggregation and maximum host processing efficiencies for a large number of independent application flows, even in the presence of a high degree of flow interleaving in the network.
- Preserves the effectiveness of GRO packet aggregation and host processing efficiencies in the presence of minor packet drops with quick recovery.
- Allows for substantial network throughput improvements for a single application flow by enabling network fabric route parallelism via the ability to restore the order of received packets that have been intentionally transmitted out of order across multiple network interfaces, i.e., spray-like traffic patterns.
- Provides the host software stack processor the ability to dynamically adapt to incoming packet processing loads, while still maintaining minimal latency for packet delivery to applications. Packet headers and payloads become available to the host software stack as soon as they arrive, regardless of the GRO state.

ADDITIONAL EMBODIMENTS

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
providing a host comprising a host protocol stack and a host memory;
providing a network interface card (NIC) configured to receive a plurality of packets from a network and pass the plurality of packets to the host;
receiving, at the host protocol stack, a packet of the plurality of packets from the NIC, the packet associated with a flow from a plurality of flows for the network;
comparing, by the host protocol stack, a sequence number of the packet with sequence numbers for a plurality of payload aggregations associated with the flow, each payload aggregation comprising one or more payloads from network packets associated with the flow;
determining, by the host protocol stack and based on the comparison, that a payload for the packet fills a gap between a first payload aggregation and a second payload aggregation from the plurality of payload aggregations,
wherein the first payload aggregation begins at a first sequence number and the second payload aggregation ends at a second sequence number; and
combining, by the host protocol stack and in response to the determination, the first payload aggregation with the second payload aggregation to form a third payload aggregation comprising the payload, wherein the third payload aggregation begins at the first sequence number and ends at the second sequence number.

2. The method of claim 1, further comprising:
receiving, at the host protocol stack, an additional packet associated with the flow;
determining, by the host protocol stack, that a payload for the additional packet does not belong to any existing payload aggregation from the plurality of payload aggregations; and
performing, by the host protocol stack, at least one of:
assigning the payload for the additional packet to a new payload aggregation for the flow; or
flushing the plurality of payload aggregations associated with the flow.

3. The method of claim 1, wherein the plurality of payload aggregations are arranged according to sequence numbers covered by each respective payload aggregation.

4. The method of claim 1, further comprising forming a new packet that includes payloads from one of the payload aggregations.

5. The method of claim 1, wherein comparing the sequence number of the packet with the sequence numbers for the plurality of payload aggregations comprises considering a length of the packet.

6. The method of claim 1, wherein a length of the packet corresponds to a length of the gap between the first payload aggregation and the second payload aggregation.

7. The method of claim 1, wherein combining the first payload aggregation with the second payload aggregation comprises adding the payload of the packet to the third payload aggregation.

8. The method of claim 1, further comprising renumbering at least one payload aggregation from the plurality of payload aggregations.

9. A system comprising:
a host comprising a host protocol stack and a host memory; and
a network interface card (NIC) configured to receive a plurality of packets from a network and pass the packets to the host,
wherein the host protocol stack is configured to:
receive a packet of the plurality of packets from the NIC, the packet associated with a flow from a plurality of flows for the network;
compare a sequence number of the packet with sequence numbers for a plurality of payload aggregations associated with the flow, each payload aggregation comprising one or more payloads from network packets associated with the flow;
determine, based on the comparison, that a payload for the packet fills a gap between a first payload aggregation and a second payload aggregation from the plurality of payload aggregations,
wherein the first payload aggregation begins at a first sequence number and the second payload aggregation ends at a second sequence number; and
combine, in response to the determination, the first payload aggregation with the second payload aggregation to form a third payload aggregation comprising the payload,
wherein the third payload aggregation begins at the first sequence number and ends at the second sequence number.

10. The system of claim 9, wherein the host protocol stack is configured to:
receive an additional packet associated with the flow;
determine that a payload for the additional packet does not belong to any existing payload aggregation from the plurality of payload aggregations; and
at least one of:
assign the payload for the additional packet to a new payload aggregation for the flow; or
flush the plurality of payload aggregations associated with the flow.

11. The system of claim 9, wherein the plurality of payload aggregations are arranged according to sequence numbers covered by each respective payload aggregation.

12. The system of claim 9, wherein the host protocol stack is further configured to form a new packet that includes payloads from one of the payload aggregations.

13. The system of claim 9, wherein, to compare the sequence number of the packet with the sequence numbers for the plurality of payload aggregations, the host protocol stack considers a length of the packet.

14. The system of claim 9, wherein a length of the packet corresponds to a length of the gap between the first payload aggregation and the second payload aggregation.

15. The system of claim 9, wherein, to combine the first payload aggregation with the second payload aggregation, the host protocol stack adds the payload of the packet to the third payload aggregation.

16. The system of claim 9, wherein the host protocol stack is further configured to renumber at least one payload aggregation from the plurality of payload aggregations.

\* \* \* \* \*